(12) United States Patent
Le Quere

(10) Patent No.: US 10,816,114 B2
(45) Date of Patent: Oct. 27, 2020

(54) CONNECTING DEVICE HAVING A MOVABLE SEAL FOR CHAMFERED TUBE

(71) Applicant: PARKER HANNIFIN MANUFACTURING FRANCE SAS, Annemasse (FR)

(72) Inventor: Philippe Le Quere, Betton (FR)

(73) Assignee: PARKER HANNIFIN MANUFACTURING FRANCE SAS, Annemasse (FR)

( * ) Notice: Subject to any disclaimer, the term of this patent is extended or adjusted under 35 U.S.C. 154(b) by 104 days.

(21) Appl. No.: 15/564,744

(22) PCT Filed: Apr. 7, 2016

(86) PCT No.: PCT/EP2016/057640
§ 371 (c)(1),
(2) Date: Oct. 6, 2017

(87) PCT Pub. No.: WO2016/162432
PCT Pub. Date: Oct. 13, 2016

(65) Prior Publication Data
US 2018/0106400 A1    Apr. 19, 2018

(30) Foreign Application Priority Data
Apr. 10, 2015    (FR) .................................... 15 53144

(51) Int. Cl.
| F16L 17/02 | (2006.01) |
| F16L 37/00 | (2006.01) |
| F16L 37/091 | (2006.01) |

(52) U.S. Cl.
CPC ............. *F16L 17/02* (2013.01); *F16L 37/091* (2013.01); *F16L 37/0915* (2016.05)

(58) Field of Classification Search
CPC ..... F16L 17/02; F16L 37/091; F16L 37/0915; F16L 21/02; F16L 21/08; F16L 17/073; F16L 37/092
(Continued)

(56) References Cited

U.S. PATENT DOCUMENTS 2,766,998 A * 10/1956 Watts ...................... F16L 17/08
285/334.2
5,655,797 A    8/1997 Edstrom, Sr. et al.
(Continued)

FOREIGN PATENT DOCUMENTS

EP    1 087 168 A1    3/2001
FR    2938038 A1    5/2010
(Continued)

OTHER PUBLICATIONS

International Search Report and Written Opinion for corresponding Patent Application No. PCT/EP2016/057640 dated Jul. 7, 2016.

*Primary Examiner* — Zachary T Dragicevich
*Assistant Examiner* — William S. Choi
(74) *Attorney, Agent, or Firm* — Renner, Otto, Boisselle & Sklar, LLP

(57) ABSTRACT

A coupling device for a fluid transport tube (100) having an end provided with an internal chamfer (101), the device comprising a body (1) including a cylindrical wall (2) defining a channel (3) having an end segment provided with means for securing the tube end thereto in leaktight manner, these means including an elastically deformable annular sealing element (6) comprising a support ring (61) having an axially projecting first face from which there extends a tubular portion (62) having a free end (63) arranged to bear against the internal chamfer (101) of the tube end (100) in order to be forcibly engaged in the tube end while the tube is being inserted into the end segment.

9 Claims, 2 Drawing Sheets

(58) Field of Classification Search
USPC ....... 285/105, 340, 379, 95, 104, 332, 334.2
See application file for complete search history.

(56) References Cited

U.S. PATENT DOCUMENTS

| | | | | |
|---|---|---|---|---|
| 5,988,690 A | * | 11/1999 | Bogard | ................... F16L 19/08 |
| | | | | 285/340 |
| 6,517,124 B1 | | 2/2003 | Le Quere | |
| 2012/0248767 A1 | * | 10/2012 | Lippka | ................... F16L 17/04 |
| | | | | 285/369 |

FOREIGN PATENT DOCUMENTS

| | | |
|---|---|---|
| FR | 3 006 030 A1 | 11/2014 |
| WO | 2010/052386 A1 | 5/2010 |

* cited by examiner

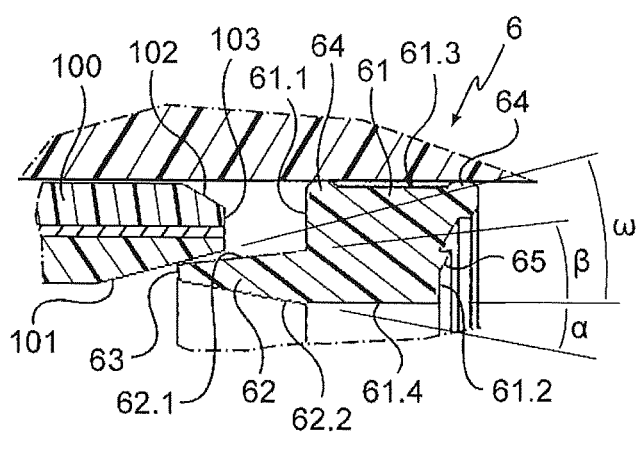 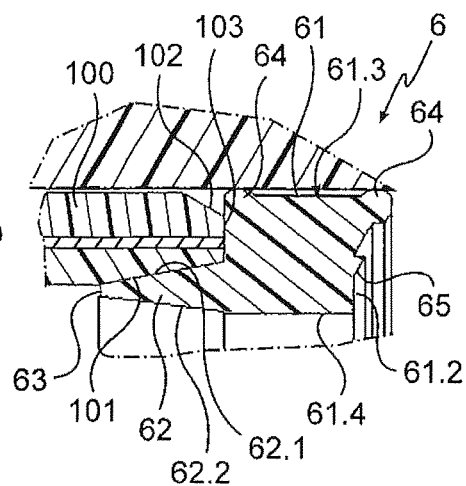
Fig. 2  Fig. 3
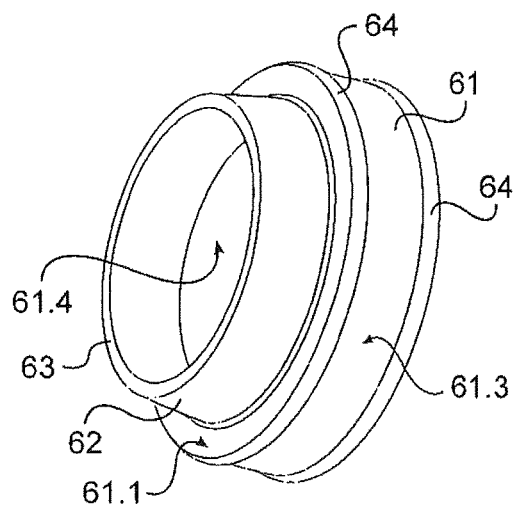
Fig. 4
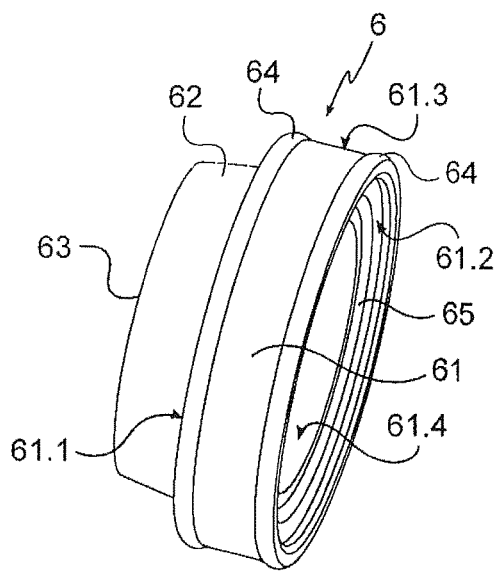
Fig. 5

CONNECTING DEVICE HAVING A MOVABLE SEAL FOR CHAMFERED TUBE

The present invention relates to fluid transport circuits, and more particularly to a coupling device for coupling a tube to a circuit element such as another tube or a fluid emitter or receiver device such as a manifold, an actuator, a regulator, . . . .

STATE OF THE ART

Coupling devices exist for fluid transport tubes that have an end which is provided with an internal chamfer. Such a device comprises a body having a cylindrical wall defining a channel with an end segment provided with means for securing the tube end therein in leaktight manner. These means include an elastically deformable annular sealing element and an attachment element for attaching the tube, such as a toothed attachment washer.

The most usual sealing elements have a cross-section that is circular and arranged to allow the sealing elements to grip the tube. Nevertheless, there exist sealing elements with sections of other shapes, and for example sealing elements of square section comprising a support ring having a first face looking towards an inlet of the end segment and an opposite second annular face, an external peripheral surface, and an internal peripheral surface.

A difficulty that is encountered with such coupling devices relates to using them with multilayer tubes. Specifically, it is important for sealing to be provided at the tube end in such a manner as to ensure that the fluid contacting the tube does not lead to the layers of the tube being delaminated. For this purpose, it is known to have recourse to sealing elements that come into contact with the terminal face of the tube. Nevertheless, the correct engagement force for the tube is not constant from one tube to another since it depends on the ovalization presented by the tube. As a result the terminal face of the tube is not always pressed against the sealing element.

OBJECT OF THE INVENTION

An object of the invention is to improve the sealing of such coupling devices.

BRIEF SUMMARY OF THE INVENTION

To this end, the invention provides a coupling device for a fluid transport tube having an end provided with an internal chamfer. The device comprises a body including a cylindrical wall defining a channel having an end segment provided with means for securing the tube end thereto in leaktight manner. These means include an elastically deformable annular sealing element comprising a support ring having a first face towards an inlet of the end segment in order to come into contact with a terminal face of the tube and an opposite second annular face, an external peripheral surface, and an internal peripheral surface. The body includes an abutment against the sealing element being pushed into the body. The sealing element comprises a tubular portion that projects axially from the first face towards an inlet of the end segment and that has a free end arranged to bear against the internal chamfer of the tube end in order to be forcibly engaged in the tube end while the tube is being inserted into the end segment before the terminal face of the tube comes into contact against the first face of the support ring. The sealing element has its second face subjected to the fluid and is mounted to be movable in axial translation in the end segment so as to be pressed against the tube end under the effect of the fluid under pressure.

This arrangement ensures sealing in particularly reliable manner, particularly but not exclusively for multilayer tubes.

Other characteristics and advantages of the invention appear on reading the following description of a particular, non-limiting embodiment of the invention.

BRIEF DESCRIPTION OF THE FIGURES

Reference is made to the accompanying drawings, in which:

FIG. 2 is a fragmentary view on a larger scale and in longitudinal section showing the coupling device while the tube is being inserted;

FIG. 3 is a view analogous to FIG. 2 at the end of inserting the tube;

FIG. 4 is a perspective view of the sealing element, showing more particularly the front of the sealing element; and FIG. 5 is a perspective view of the sealing element, showing more particularly the rear of the sealing element.

DETAILED DESCRIPTION OF THE INVENTION

Figure 1:
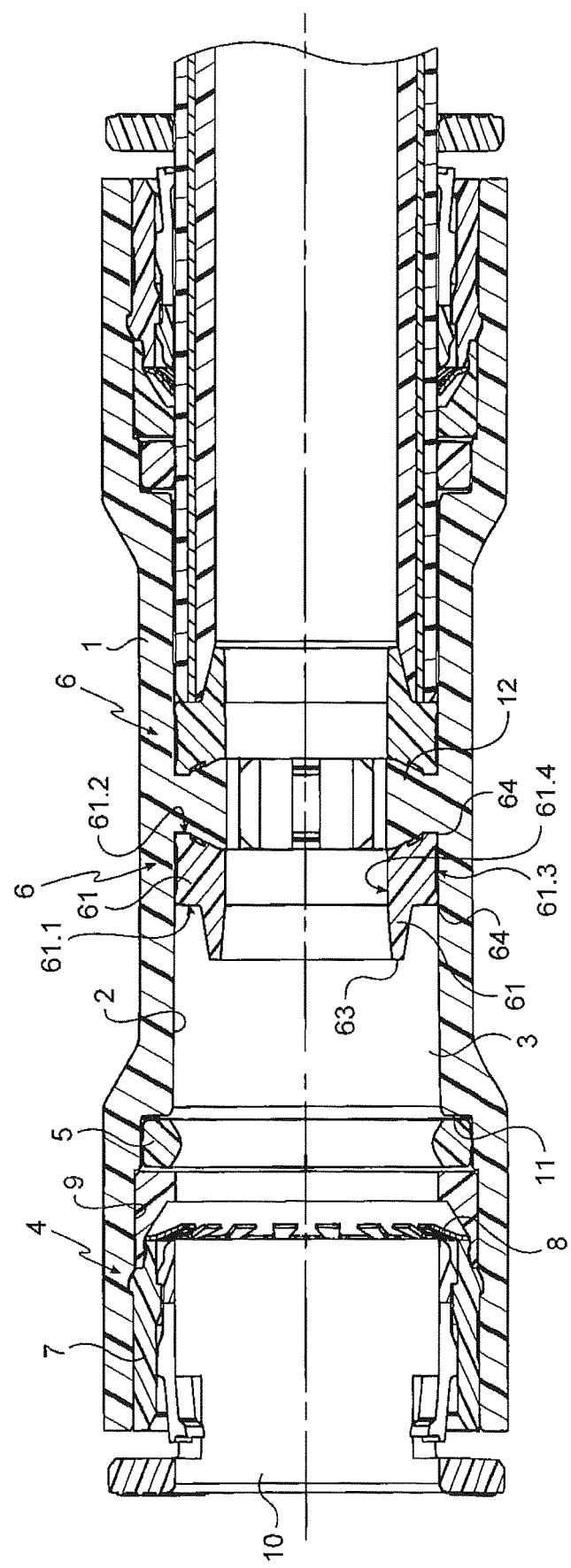
FIG. 1 is a longitudinal section view of a coupling device in accordance with the invention.

The coupling device shown in the figures is a double coupling device for connecting together two tubes 100. Each tube 100 is a multilayer tube (in this example having an inner layer, an intermediate layer, and an outer layer) and it has an end provided with an internal chamfer 101 and with an external chamfer 102. The internal chamfer 101 and the external chamfer 102 are connected together by a radial surface 103 forming the terminal face of the tube end. The intermediate layer is apparent in the radial surface 103.

The coupling device has a body 1 that is axially subdivided into two mutually identical connection sections. The body 1 has a cylindrical wall 2 that defines a channel 3 having end segments, each provided with means for securing one of the tube ends therein in leaktight manner.

For each end segment, in this example these means comprise:

- an attachment assembly, given overall reference 4, for attaching to the tube end 100;
- a first annular sealing element 5 made of elastically deformable material; and
- a second annular sealing element, given overall reference 6, made of elastically deformable material.

The attachment assembly 4 comprises a two-part insert 7 with an internally toothed washer 8 received between them for biting into the external surface of the tube end. The insert 7 is received in an inlet chamber 9 of the end segments of the channel 2 and slidably receives a disconnection pusher 10 that is movable between an extended position in which the tip of the disconnection pusher 10 is spaced apart from the washer 8, and a pushed-in position in which the tip of the disconnection pusher 10 lifts up the teeth of the washer 8.

The sealing element 5 is received in the inlet chamber 9 between the insert 7 and a shoulder 11 marking the end of the inlet chamber 9. The sealing element 5 is substantially rectangular in section with an inner portion that bulges towards the central axis of the sealing element 5. The sealing element 5 also has an external bead projecting from its external peripheral surface. The sealing element 5 is of dimensions suitable for gripping the external surface of the tube end 100 elastically.

The sealing element 6 comprises a support ring 61 having a first annular face 61.1 towards an inlet of the end segment, a second annular face 61.2 opposite from the first face 61.1, a cylindrical external peripheral surface 61.3, and a cylindrical internal peripheral surface 61.4.

The sealing element 6 comprises a tubular portion 62 that projects axially from the first face 61.1 towards an inlet of the end segment and that has a free end 63 arranged to bear against the internal chamfer 101 of the tube end 100 in order to be forcibly engaged in the tube end 100 while the tube 100 is being inserted into the end segment. The tubular portion 62 has a frustoconical external surface 62.1 tapering towards the free end 63 of the tubular portion 62, and a frustoconical internal surface 62.2 flaring towards the free end 63 of the tubular portion 62.

The internal frustoconical surface 62.2 forms an angle α with the internal peripheral surface 61.4 (or the central axis of the channel), where the angle α is about 15° in this example (when the sealing element 6 is at rest). The internal chamfer 101 forms an angle ω with the internal peripheral surface 61.4 (or the central axis of the channel), where the angle ω is about 20° in this example. The angle ω is preferably about 5° smaller than the angle α. The angle β between the internal frustoconical surface 62.1 and the internal peripheral surface 61.4 (or the central axis of the channel) is no greater than the difference between the angle ω and the angle α.

Two beads 64 project radially from the external surface 61.3 of the sealing element 6 in order to bear against the wall 2 of the end segment. The beads 64 are spaced apart from each other in order to improve the stability of the sealing element 6. More precisely in this example, the beads 64 are arranged along two opposite edges of the external surface 61.3 of the sealing element 6.

The second face 61.2 of the sealing element 6 is concave. More precisely, this second face has a radial external border, a radial central portion, and between them a projecting frustoconical intermediate portion from which an annular rib 65 extends coaxially.

The sealing element 6 is mounted in a terminal portion of the end segment between the sealing element 5 and a central step 12 of the body 1. The central step 12 is substantially annular in shape, but it is interrupted by grooves in such a manner that even when the second face 61.2 is bearing against the central step 12, fluid under pressure can reach the second face 61.2. The grooves thus allow fluid to pass towards the second face 61.2 of the sealing element 6. The central step 12 is defined in the width direction by two surfaces that are of a frustoconical shape that is substantially complementary to the second face 61.2.

The sealing element 6 is dimensioned in such a manner as to be gripped in the terminal portion of the end segment of the channel 2 while remaining movable in axial translation in the end portion under the effect of the fluid under pressure applied against the second lateral face 61.2.

It can be understood that when the tube end 100 is pushed into the end segment of the channel 2, the free end 63 comes into contact with the internal chamfer 101 and is forcibly engaged in the tube end 100, thereby deforming the tubular portion 62 (FIG. 2). It should be observed that the central step 12 opposes the sealing element 6 being pushed into the channel 2 under the force exerted by the tube 100 while making the connection.

At the end of making the connection (FIG. 3), the terminal face 103 of the tube end bears against the first face 61.1, the tubular portion 62 is gripped in the tube end 100 via the internal chamfer 101, and the sealing element 6 bears against the central step 12. The internal frustoconical surface 62.1 then extends substantially in alignment with the internal peripheral surface 61.4 so that the deformation of the tubular portion 62 does not lead to a reduction in the through section of the sealing element 6. When the circuit including the tube and the coupling device is put under pressure, the fluid under pressure exerts pressure against the second face 61.2 that remains pressed against the terminal face of the tube end 100, which moves back a little until the teeth of the washer bite into the external surface of the pipe end 100.

If the tube 100 is not pushed in correctly, the terminal face 103 does not come into contact with the first face 61.1. In this situation, sufficient sealing is nevertheless ensured by the tubular portion 62 being in contact against the internal chamfer 101 (FIG. 2). When the circuit is put under pressure, the fluid exerts pressure on the second face 61.2 that is greater than the pressure exerted beside the tubular portion 62. As a result the sealing element 6 moves towards the inlet of the channel 2 until the first face 61.1 comes into abutment against the terminal face 103.

The sealing element 5 also makes it possible to ensure sealing in the event of using a tube having an inside diameter that is greater than the outside diameter of the tubular portion 62 (such a tube diameter making the tubular portion 62 inoperative).

Naturally, the invention is not limited to the embodiments described but covers any variant coming within the ambit of the invention as defined by the claims.

In particular, the coupling device may be arranged to couple a tube to a circuit element. The body of the coupling device has a first connection section for connection to a tube and a second connection section for connection to the circuit element. The second connection section may be integral with the body of the circuit element or it may be provided with means for being installed in the circuit element. The second connection element may for example be provided with a thread enabling it to be engaged in tapping in the body of the circuit element.

The sealing elements may be of shapes other than those described.

By way of example, the sealing element 5 may have a section that is circular or four-lobed.

The sealing element 6 may have a tubular portion including at least one cylindrical surface.

The anchor element may be of a type other than an attachment washer, and for example it may comprise a clamp integral with the disconnection pusher or a ring that is movable radially.

The angles ω, α, and β may have values other than those mentioned.

The invention claimed is:

1. A coupling device for a fluid transport tube having an end provided with an internal chamfer, the coupling device comprising:

a body including a cylindrical wall defining a channel having an end segment; and an elastically deformable annular sealing element arranged in the end segment for securing the tube end to the body in a leaktight manner and including a support ring having a first face that faces towards an inlet of the end segment and contacts a terminal face of the tube, an opposite second annular face, an external peripheral surface, and an internal peripheral surface, wherein the body includes an internal abutment that abuts against the sealing element being pushed into the body, wherein the sealing element includes a tubular portion that projects axially from the first face towards the inlet of the end segment, and a free end arranged to bear against the internal chamfer of the tube end to be forcibly engaged in the tube end while the tube is being inserted into the end segment before the terminal face of the tube comes into contact against the first face of the support ring, wherein the tubular portion is deformed when the free end contacts the internal chamfer, and wherein the second annular face of the sealing element is subjected to the fluid and is mounted to be movable in axial translation in the end segment so as to be pressed against the tube end under an effect of the fluid under pressure, wherein the internal abutment of the body includes at least one groove for allowing the fluid to pass towards the second face of the sealing element.

2. The coupling device according to claim 1, wherein the tubular portion has a frustoconical external surface tapering towards the free end of the tubular portion.

3. The coupling device according to claim 1, wherein the tubular portion has a frustoconical internal surface flaring towards the free end of the tubular portion.

4. The coupling device according to claim 3, wherein the frustoconical internal surface forms a first angle with a central axis of the channel, which first angle is less than a second angle formed between the internal chamfer and the central axis.

5. The coupling device according to claim 4, wherein the tubular portion has a frustoconical external surface tapering towards the free end of the tubular portion and forming a third angle with the central axis, which third angle is no greater than the difference between the second angle and the first angle.

6. The coupling device according to claim 1, wherein two beads project radially from the external peripheral surface of the sealing element in order to bear against the wall of the end segment.

7. The coupling device according to claim 1 further comprising beads that are arranged along two opposite edges of the external peripheral surface of the sealing element.

8. The coupling device according to claim 1, wherein the second face is concave.

9. The coupling device according to claim 1, wherein at least one annular rib projects coaxially from the second face.

* * * * *